United States Patent
Kwangkaew et al.

(10) Patent No.: US 11,143,551 B2
(45) Date of Patent: Oct. 12, 2021

(54) PROXIMITY SENSOR WITH INFRARED INK COATING

(71) Applicant: HANA Microelectronics, Inc., Santa Clara, CA (US)

(72) Inventors: Vanapong Kwangkaew, Wang Noi (TH); Sirirat Silapapipat, Ladroad (TH); Sanjay Mitra, Colorado Springs, CO (US)

( * ) Notice: Subject to any disclaimer, the term of this patent is extended or adjusted under 35 U.S.C. 154(b) by 0 days.

(21) Appl. No.: 16/416,054

(22) Filed: May 17, 2019

(65) Prior Publication Data

US 2019/0353518 A1 Nov. 21, 2019

Related U.S. Application Data

(60) Provisional application No. 62/673,764, filed on May 18, 2018.

(51) Int. Cl.
*G01J 1/06* (2006.01)

(52) U.S. Cl.
CPC ....................... *G01J 1/06* (2013.01)

(58) Field of Classification Search
CPC ......................................................... G01J 1/06
See application file for complete search history.

(56) References Cited

U.S. PATENT DOCUMENTS

| | | |
|---|---|---|
| 8,604,436 B1 | 12/2013 | Patel et al. |
| 9,201,894 B2 | 12/2015 | Fukuda et al. |
| 2005/0032474 A1 | 2/2005 | Gordon |
| 2006/0237540 A1 | 10/2006 | Saxena |
| 2007/0046629 A1 | 3/2007 | Chi-Boon et al. |
| 2007/0090282 A1 | 4/2007 | Chin et al. |
| 2008/0011939 A1 | 1/2008 | Yee et al. |
| 2008/0205495 A1 | 8/2008 | Trott |
| 2008/0296478 A1* | 12/2008 | Hernoult ............... G01J 1/02 250/216 |
| 2009/0159900 A1 | 6/2009 | Basoor et al. |
| 2010/0258710 A1 | 10/2010 | Wiese et al. |
| 2010/0282951 A1 | 11/2010 | Costello et al. |
| 2010/0327164 A1* | 12/2010 | Costello ............... H01L 24/97 250/338.1 |
| 2011/0024627 A1* | 2/2011 | Yao ....................... G01J 1/04 250/338.4 |
| 2011/0057102 A1* | 3/2011 | Yao ..................... G01S 7/4813 250/338.1 |
| 2011/0057104 A1* | 3/2011 | Yao ....................... G01J 1/32 250/338.1 |

(Continued)

FOREIGN PATENT DOCUMENTS

| | | |
|---|---|---|
| GB | 2466000 A | 6/2012 |
| GB | 2490386 A | 10/2012 |

(Continued)

*Primary Examiner* — Blake C Riddick
(74) *Attorney, Agent, or Firm* — West & Associates, A PC; Stuart J. West; Charlotte Rodeen-Dickert

(57) ABSTRACT

A sensor comprising a light emitter and light detector directly covered and encapsulated by a layer of light transmissive compound. A gap in the light transmissive compound between the light emitter and the light detector filled with an infrared ink. In some embodiments, an infrared ink can cover at least a portion of a top surface of the sensor and define apertures above the light detector and/or light emitter.

6 Claims, 5 Drawing Sheets

(56) References Cited

U.S. PATENT DOCUMENTS

| | | | |
|---|---|---|---|
| 2011/0057108 A1* | 3/2011 | Yao | G01S 17/48 250/338.4 |
| 2011/0057129 A1* | 3/2011 | Yao | G01S 17/48 250/552 |
| 2011/0121182 A1 | 5/2011 | Wong et al. | |
| 2011/0133941 A1* | 6/2011 | Yao | G01J 1/0271 340/600 |
| 2011/0163233 A1 | 7/2011 | Ng et al. | |
| 2011/0186736 A1* | 8/2011 | Yao | G01S 7/4813 250/338.4 |
| 2011/0204233 A1* | 8/2011 | Costello | H03K 17/941 250/338.4 |
| 2011/0296478 A1 | 12/2011 | Jin | |
| 2011/0297831 A1 | 12/2011 | Yao et al. | |
| 2011/0297832 A1 | 12/2011 | Yao et al. | |
| 2012/0037793 A1 | 2/2012 | Ong et al. | |
| 2012/0145932 A1 | 6/2012 | Yao et al. | |
| 2012/0160994 A1 | 6/2012 | Costello et al. | |
| 2012/0293472 A1 | 11/2012 | Wong et al. | |
| 2013/0010310 A1 | 1/2013 | Wong et al. | |
| 2013/0026350 A1 | 1/2013 | Yao et al. | |
| 2013/0048837 A1* | 2/2013 | Pope | G01J 1/4204 250/214.1 |
| 2013/0256926 A1* | 10/2013 | Dinesen | G01S 17/08 264/1.7 |
| 2013/0292706 A1* | 11/2013 | Costello | G01D 5/34715 257/82 |
| 2014/0223734 A1* | 8/2014 | Song | H01L 24/97 29/846 |
| 2014/0252213 A1* | 9/2014 | Ruh | G01D 5/26 250/227.11 |
| 2015/0008329 A1* | 1/2015 | Chen | G01J 1/42 250/393 |
| 2015/0330772 A1* | 11/2015 | Charusabha | H05K 3/284 250/353 |
| 2016/0282510 A1* | 9/2016 | Kwangkaew | G01S 17/04 |
| 2016/0306042 A1* | 10/2016 | Schrank | H01L 31/02164 |
| 2017/0052277 A1* | 2/2017 | Wong | H01L 25/167 |
| 2017/0184764 A1* | 6/2017 | Matsuyuki | H05K 5/0017 |
| 2018/0081093 A1* | 3/2018 | Wang | G02B 5/0294 |

FOREIGN PATENT DOCUMENTS

| | | |
|---|---|---|
| KR | 20120007533 A | 1/2012 |
| WO | 2016154582 A1 | 9/2016 |

\* cited by examiner

PROXIMITY SENSOR WITH INFRARED INK COATING

BACKGROUND

Field of the Invention

The present disclosure relates to proximity, color, gesture, and/or motion sensors, particularly optical sensors having an infrared ink coating.

Background

Proximity, color, gesture, and motion sensors are often used in a variety of devices, including mobile phones, personal media players, tablet computers, laptop computers, amusement and vending machines, industrial machinery, contactless switches, automated sanitary machinery, and other devices. By way of a non-limiting example, some mobile phones incorporate a proximity sensor near the mobile phone's touchscreen so that the screen can be turned off to save power and to avoid unwanted touch inputs when the mobile phone is being used and a user's head is near to the screen or is touching the screen.

FIG. 1 depicts a prior art optical proximity sensor 100. Optical proximity sensors 100 can comprise one or more light emitters 102 and one or more light detectors 104. In some embodiments, the light emitters 102 can be light emitting diodes (LEDs) that emit infrared light, and the light detectors 104 can be photodiodes configured to detect infrared light. As can be seen from FIG. 1, when an object 108 is located proximate to the optical proximity sensor 100, infrared light 106 emitted by the light emitter 102 can be reflected off of the object 108 and be directed back toward the light detector 104. The reflected rays of infrared light 106 can be detected by the light detector 104, which can provide an indication that the object 108 is proximate to the optical proximity sensor 100, and/or can provide information about the motion of the object 108 relative to the optical proximity sensor 100 such that the optical proximity sensor 100 can act as a motion sensor or gesture sensor.

Crosstalk can be undesirable interactions between the light emitters 102 and light detectors 104 in optical proximity sensors 100. Crosstalk can occur when light travels directly or indirectly from the light emitter 102 to the light detector 104 without being reflected off of a nearby object 108, thereby leading to false positives in motion or proximity detection. To decrease the level of crosstalk between the light emitters 102 and light detectors 104, many optical proximity sensors 100 have one or more blocking components 110 placed or formed between the light emitters 102 and light detectors 104 to block at least some non-reflected light transmission between the light emitters 102 and the light detectors 104.

In many optical proximity sensors 100, the blocking component 110 can be a shield, such as a metal shield or a shield of any other material that blocks the transmission of infrared light. Shields are often manufactured separately, and are placed between the light emitter 102 and light detector 104 during assembly of the optical proximity sensor 100, as shown in FIG. 1. However, the use of a separately manufactured metal shield can add manufacturing expenses due to the materials cost of the metal or other infrared-blocking material, the often small size of the shields, and the cost of custom machinery to form the shield and to place the shield during assembly. Additionally, the shield can be dented or deformed during use, or can come loose and be displaced from the rest of the optical proximity sensor 100. As the placement and structural form of the blocking component 110 can be important in inhibiting light transfer in certain directions to limit crosstalk, deformation or displacement of the shield can lead to decreased performance of the optical proximity sensor 100 by allowing higher levels of crosstalk.

In other optical proximity sensors 100, the blocking component 110 can be a light blocking compound 112 that blocks transmission of substantially all light within a particular spectrum through the light blocking compound 112, as shown in FIG. 2. Optical proximity sensors 100 that comprise light blocking compounds 112 have traditionally been formed using a double mold process in combination with light transmissive compounds 114 that allow the transmission of substantially all light within a particular spectrum.

In a double mold manufacturing process, light transmissive compounds 114 are first encapsulated over a light emitter 102 and light detector 104. The light transmissive compounds 114 are molded over and around the light emitter 102 and light detector 104, and are allowed to cure. After the light transmissive compounds 114 have cured, the light blocking compound 112 is molded over and around the light transmissive compounds, filling a space between the light emitter 102 and light detector 104 as shown in FIG. 2, such that light emitted by the light emitter 102 will be blocked by the light blocking compound 112 from passing directly to the light detector 104. The light blocking compound 112 is generally molded to leave apertures 116 above the light emitter 102 and light detector 104, such that light emitted by the light emitter 102 can pass through the light transmissive component 114a encapsulating the light emitter 102, exit the proximity sensor 100 through the aperture 116a above the light emitter 102, be reflected by an external object 108, re-enter the proximity sensor 100 through the aperture 116b above the light detector 104, pass through the light transmissive component encapsulating the light detector 104, and finally enter the light detector 104 itself to be detected.

However, this double mold process can be expensive due to the need to use two different types of molding compounds. It can also take a long time, because the light transmissive compounds 114 must first be molded and allowed to cure over the light emitter 102 and light detector 104, and only then can the light blocking compounds 112 be molded over the previously molded light transmissive compounds 114. Additionally, special molds must be made and used to form apertures 116 that keep the light blocking compound 112 from completely covering the light transmissive compounds 114.

What is needed is an a sensor with a layer of infrared light blocking ink partially covering and inhibiting direct communication between a light emitter and light detector, such that the layer of infrared light blocking ink blocks crosstalk between the light emitter and light detector.

DETAILED DESCRIPTION

Figure 1:
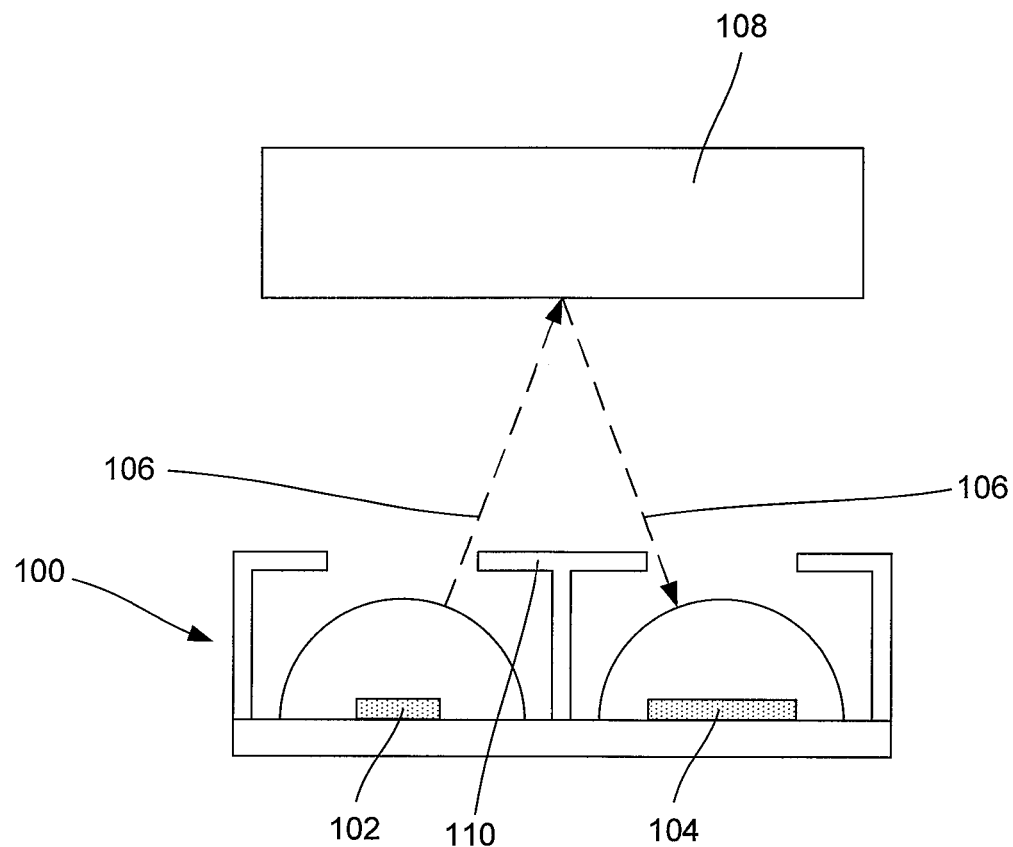
FIG. 1 depicts a first prior art proximity sensor.
Figure 2:
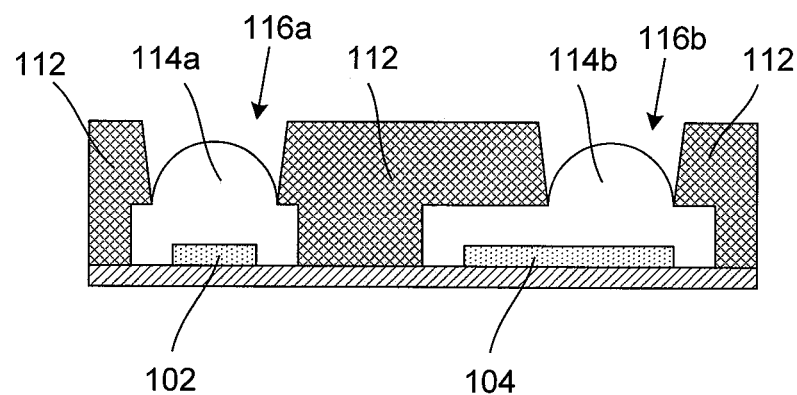
FIG. 2 depicts a second prior art proximity sensor made with a double mold process.
Figure 3:
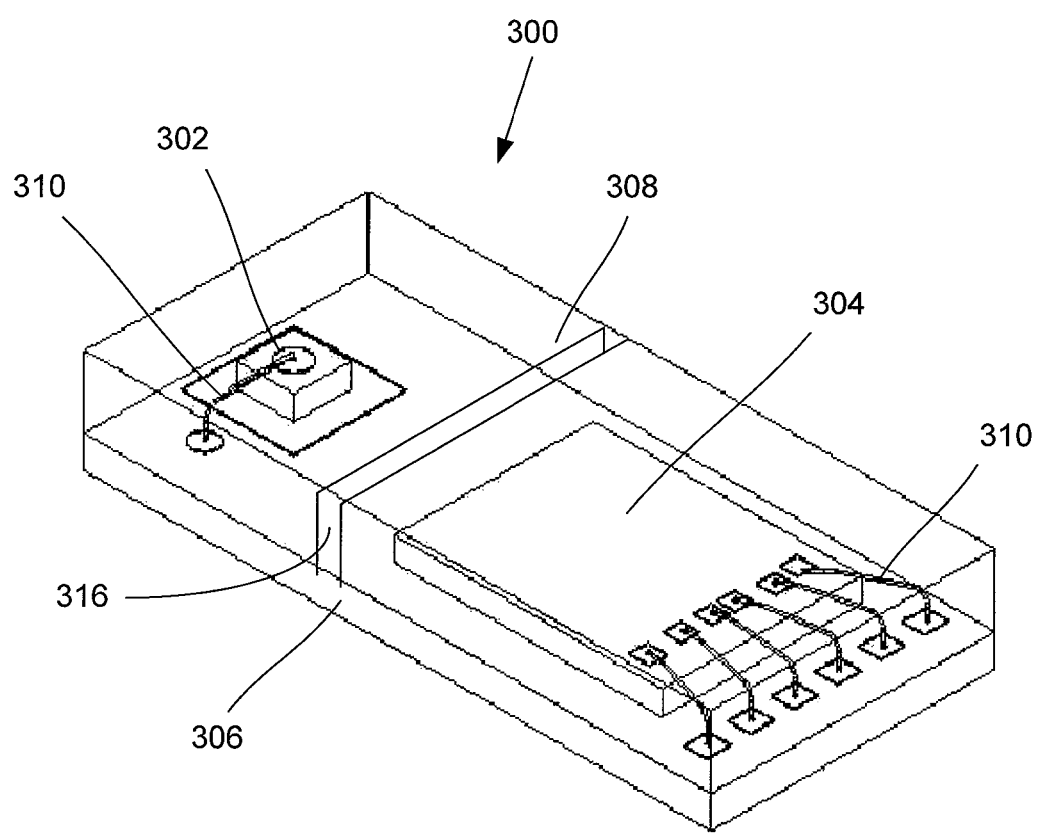
FIG. 3 depicts an embodiment of a sensor comprising an infrared light blocking ink partially covering and inhibiting direct communication between a light emitter and light detector.

FIG. 3 depicts an angled view of an embodiment of a sensor 300. The sensor 300 can be a proximity sensor, color sensor, gesture sensor, and/or motion sensor that detects nearby objects, motion of objects, light intensity, and/or light color. The sensor 300 can comprise a light emitter 302, a light detector 304, a base 306, and an optically transmissive compound 308.

The light emitter 302 can be a light source configured to emit light. In some embodiments, the light emitter 302 can be an emitter die configured to emit infrared light. By way of a non-limiting example, in some embodiments the light emitter 302 can be an infrared light emitting diode (IR LED). In alternate embodiments the light emitter 302 can be an emitter die configured to emit light at any desired wavelength or range of wavelengths within the electromagnetic spectrum. The light emitter 302 can be a bare die, prepackaged die, and/or any other type of die.

The light detector 304 can be a photodiode or other light detector configured to detect light entering the light detector 304. In some embodiments, the light detector 304 can be configured to detect infrared light. By way of a non-limiting example, in some embodiments the light detector 304 can be an infrared-responding photodiode or a die configured to detect infrared light. In alternate embodiments the light detector 304 can be configured to detect light at any desired wavelength or range of wavelengths within the electromagnetic spectrum. In some embodiments, a light detector 304 can comprise an integrated circuit configured to detect direct or reflected light entering the light detector 304.

The light emitter 302 and light detector 304 can each be mounted on different locations on the base 306. The base 306 can be a printed circuit board (PCB) or other substrate upon which other components of the sensor 300 can be mounted. In some embodiments the base 306 can comprise conductive elements such as a lead frame, individual leads, and/or metal trace input/output components. By way of a non-limiting example, in some embodiments the base 306 can have conductive elements comprising copper alloy. In other embodiments, the base 306 can have conductive elements comprising other types of conductive metal, metal alloys, or other conductive material, such as copper, ferrous alloys, nickel, cobalt, chromium, nickel alloys, silver, and/or gold, or any other conductive material.

Components of the sensor 300, such as the light emitter 302 and light detector 304, can be electrically coupled with conductive elements of the base 306 using wirebonding 310, conductive solder, or other electrical connections. The sensor 300 can also be electrically coupled with other one or more other components as part of a larger device by connecting them to the conductive elements of the base 306. By way of a non-limiting example, the sensor 300 can be installed within a larger device such as a mobile phone by connecting electrically conductive leads of the base 306 to electrically conductive components of the mobile phone.

In some embodiments the base 306 can further comprise non-conductive elements positioned between some or all conductive elements, such as epoxy molding compounds, organic material, and/or any other desired material. By way of non-limiting examples, the base 306 can comprise a laminated substrate such as an FR-4 epoxy-based laminate or a resin-based BT (Bismaleimide-Triazine) epoxy.

The structure formed by the light emitter 302, light detector 304, and the base 306 can be directly covered with a layer of an optically transmissive compound 308 to encapsulate the light emitter 302 and light detector 304 within the optically transmissive compound 308. The optically transmissive compound 308 can comprise an optically transmissive material that allows the transmission of only some light spectrum or spectra or can pass all of a spectra of light through the optically transmissive material.

The optically transmissive compound 308 can be molded or cast directly over the entirety of the structure formed by the base 306, light emitter 302, and light detector 304. Because the light emitter 302 and light detector 304 are mounted on different locations on the base 306, the optically transmissive compound 308 can fill the space between the light emitter 302 and the light detector 304 above the base 306.

In the embodiment depicted in FIG. 3, the optically transmissive compound 308 can include a gap 316 placed between the light emitter 302 and the light detector 304.

Figure 4A:
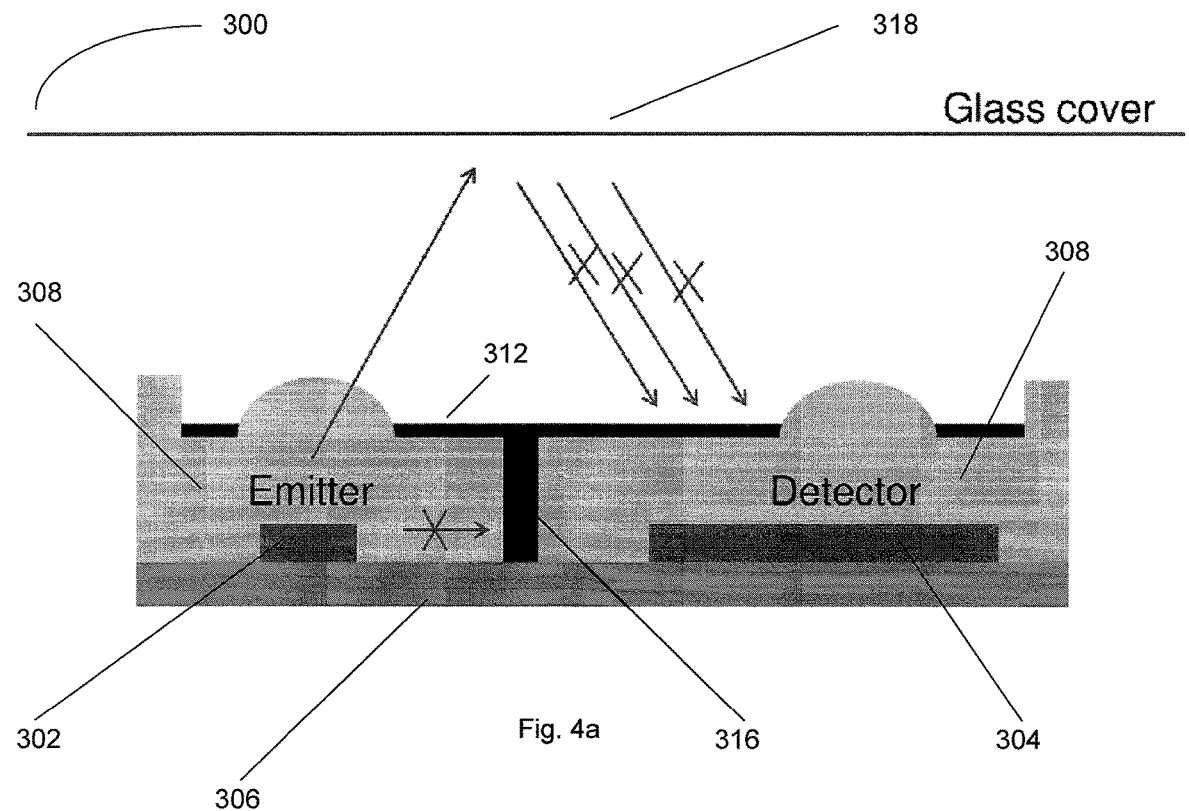
FIGS. 4a and 4b depict side views of a cross section of a sensor comprising an infrared light blocking ink partially covering and inhibiting direct communication between a light emitter and light detector.
Figure 4B:
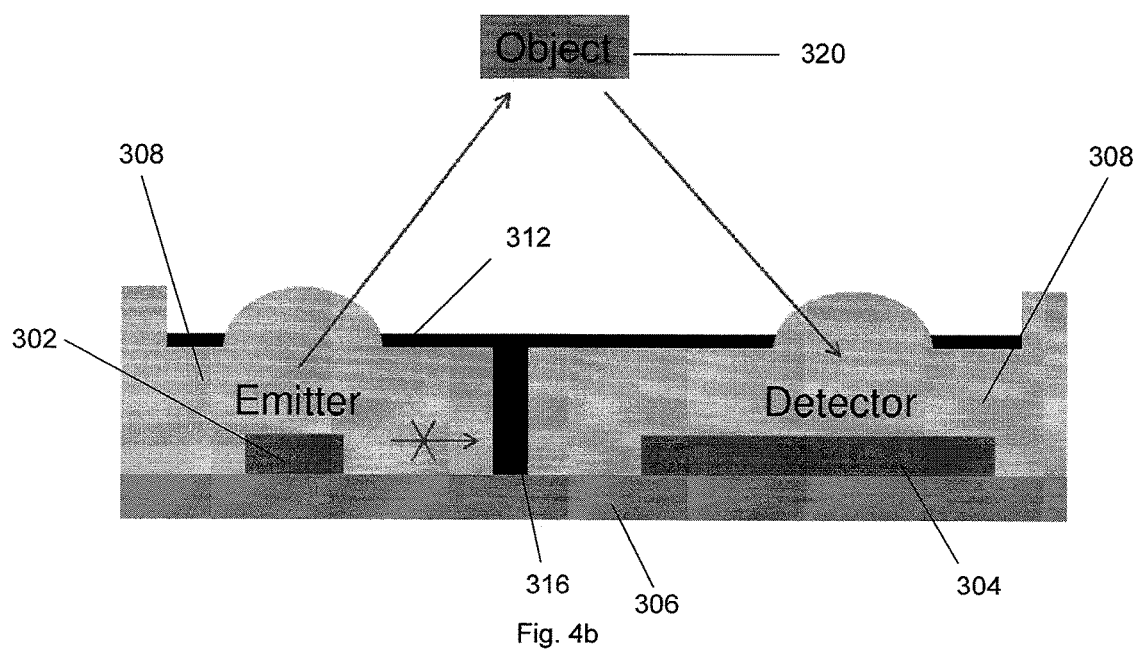

As shown in FIGS. 4a and 4b, the optically transmissive compound 308 can directly cover the light emitter 302 and light detector 304 and the optically transmissive compound 308 can be formed with a gap 316 in the optically transmissive compound 308 between the light emitter 302 and the light detector 304 and that gap 316 can be filled with an infrared ink 312 adapted and configured to attenuate, inhibit, prohibit, impede, restrict and/or otherwise reduce direct light transmission between the light emitter 302 and the light detector 304. Additionally, in some embodiments, the infrared ink 312 can be applied to portions of the top surface of the optically transmissive compound 308 and apertures in the infrared ink 312 can be established above the light emitter 302, the light detector 304 or both the light emitter 302 and light detector 304. The aperture(s) can be positioned and configured such that light can pass through the one or more apertures and can be reflected off an object 320 and detected by the light detector 304 for sensing the presence or absence of an object 320. In some embodiments the infrared ink 312 can be deposited onto the surface of the optically transmissive compound 308 via ink jet printing and/or via the use of a printing mask. However, in alternate embodiments, any known, convenient and/or desired technique for depositing infrared ink (or any ink) onto a surface can be used to deposit ink onto the upper surface of the optically transmissive compound 308. In some embodiments, the sensor 300 can be contained under a glass or other reflective or partially reflective cover 318 and the deposit pattern of the infrared ink 312 on the top surface of the sensor 300 can be configured such that errant and/or partial reflections off the cover 318 are not detected by the light detector 304. In some embodiments, the light detector 304 can be configured to detect such a decreased level of the originally emitted light level as a positive (indicative of the presence of an object) when detecting proximity, motion, gestures, or color.

As shown in FIGS. 4a and 4b, although light can be substantially blocked out by the infrared ink 312 contained within the gap 316 when traveling directly from the light emitter 302 to the light detector 304, light originating from the light emitter 302 can indirectly reach the light detector 304 when it is reflected off an exterior object 320 and re-enters the sensor 300 through the aperture above the light detector 304.

Figure 5:
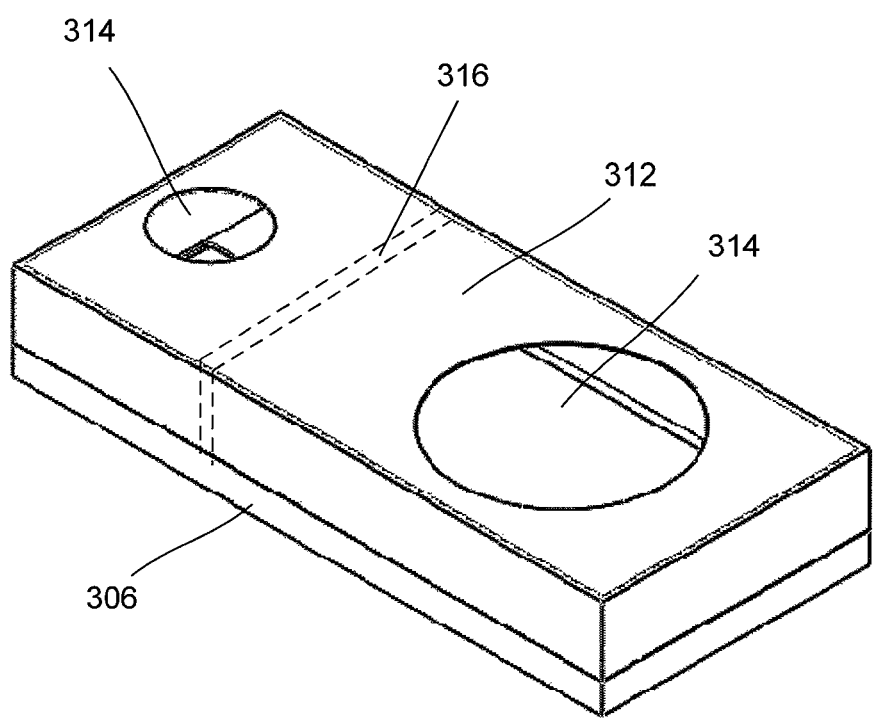
FIG. 5 depicts an isometric view on one embodiment of a sensor comprising an infrared light blocking ink partially covering and inhibiting direct communication between a light emitter and light detector.

Although in some embodiments the sensor's exterior can be formed by the optically transmissive compound 308 and the base 306 and can be otherwise uncovered, in some other embodiments the sensor's top and/or sides can be substantially covered with an opaque light blocking material and/or an infrared ink 312, as shown in FIG. 5. The opaque light blocking material and/or infrared ink 312 can be configured to block or filter transmission of the same type of light blocked by the optically transmissive compound 308. By way of a non-limiting example, the opaque light blocking material and/or infrared ink 312 can be compound GE100LFCG. The opaque light blocking material and/or infrared ink 312 can be formed with apertures 314 above the light emitter 302 and light detector 304, as shown in FIG. 5. In some embodiments, the opaque light blocking material and/or infrared ink 312 can be a compound cast or molded around the sensor 300.

In embodiments with the additional opaque light blocking material and/or infrared ink 312 around the exterior of the sensor 300, the opaque light blocking material and/or infrared ink 312 can block or inhibit most light originating from sources outside the sensor 300 from entering the sensor 300, passing through the layer of optically transmissive compound 308, and reaching the light detector 304. However, the apertures 314 in the opaque light blocking material can still allow light from the light emitter 320 and is reflected to re-enter the sensor 300 through the other aperture 314 to pass through the optically transmissive compound 308 and be detected by the light detector 304.

Figure 6:
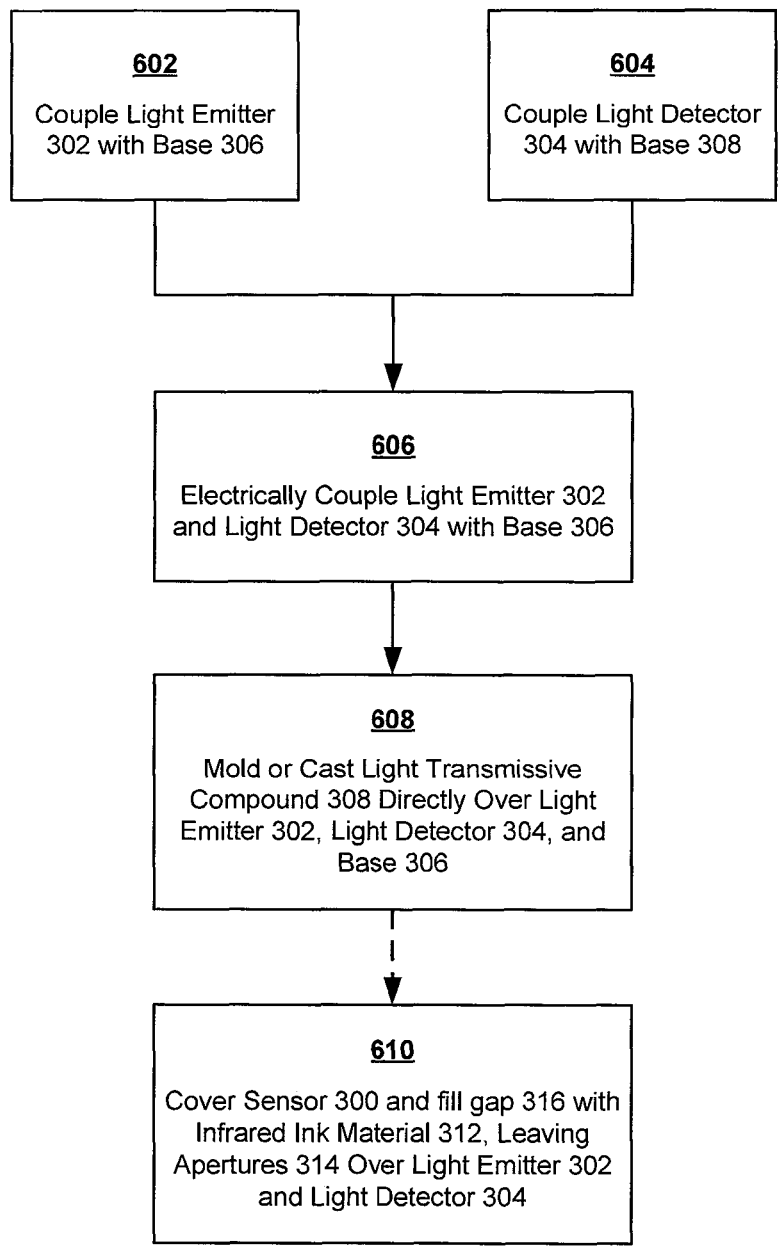
FIG. 6 depicts a process for manufacturing a sensor comprising an infrared light blocking ink partially covering and inhibiting direct communication between a light emitter and light detector.

FIG. 6 depicts steps of a process for making a sensor 300 with a layer of optically transmissive compound 308 directly covering a light emitter 302 and a light detector 304. At steps 602 and 604, a light emitter 302 and a light detector 304 can be mounted on different location on the base 306. By way of non-limiting examples, the light emitter 302 and light detector 304 can each be mounted to the top of the base 306 using adhesives, screws, bolts, solder, or any other coupling mechanism.

At step 606, the light emitter 302 and light detector 304 can be electrically coupled with conductive elements of the base 306. By way of a non-limiting example, wirebonding 310 can be used to separately connect the light emitter 302 and the light detector 304 to the base 306.

At step 608, a layer of optically transmissive compound 308 can be molded or cast over the structure formed by the light emitter 302, light detector 304, and base 306, to encapsulate the light emitter 302 and light detector 304 within the optically transmissive compound 308. A gap 316 can be included in the layer of optically transmissive compound 308. By way of a non-limiting example, the optically transmissive compound 308 can be molded over the light emitter 302, light detector 304, and base 306 using a transfer molding machine or any other suitable molding device. The optically transmissive compound 308 can directly cover the tops and sides of the light emitter 302 and light detector 304, and can fill the space between the light emitter 302 and light detector 304 above the base 306. Than an infrared ink can be applied to fill the gap 316.

In some embodiments, the process can end after step. However, in other embodiments the process can continue to step 610, during which opaque light blocking material and/or infrared ink 312 can be applied, molded, cast, or placed around the sides and top of the sensor 300. The opaque light blocking material and/or infrared ink 312 can be in direct contact with the exterior of the cured optically transmissive compound 308. The opaque light blocking material and/or infrared ink 312 can be formed with two apertures 314, with one being positioned above the light emitter 302 and one being positioned above the light detector 304.

In some embodiments a single sensor 300 can be manufactured with the process of FIG. 6. In other embodiments, a sheet of contiguous sensors 300 can be manufactured according to the steps of FIG. 6, and the sheet of contiguous sensors 300 can be singulated with a precision saw machine, metal stamping machine, or any other desired method to separate out individual sensors 300. By way of a non-limiting example, a large sheet of continuous bases 306 can be provided, and sets of light emitters 302 and light detectors 304 can be mounted to and electrically coupled with the bases 306 within the sheet. A layer of optically transmissive compound 308 can be molded or cast over the sheet with appropriately positioned gaps 316, directly covering each pair of light emitters 302 and light detectors 304 and infrared ink can be used to fill the gaps 316. After the optically transmissive compound 308 and infrared ink 316 have cured over the entire sheet, the sheet can be singulated to separate out individual sensors 300.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:
1. A sensor, comprising:
an infrared light emitter mounted at a first position on a base;
an infrared light detector mounted at a second position on said base;
a first region of optically transmissive material covering said light emitter;
a second region of optically transmissive material covering said light detector, wherein said first region of optically transmissive material and said second region of optically transmissive material define a gap, and
an infrared-blocking ink that fills said gap;
wherein said ink can at least partially cover a top surface of said first region of optically transmissive material,
wherein said ink can at least partially cover a top surface of said second region of optically transmissive material;
and wherein said ink filling said gap is contiguous with said ink covering said top surface of said first region and said second region of optically transmissive material.

2. The sensor of claim 1 wherein said ink is a light attenuating ink.

3. The sensor of claim 1 wherein said ink is a light impeding ink.

4. The sensor of claim 1 wherein said ink is a light impervious ink.

5. The sensor of claim 1 wherein a deposit pattern of said ink at least partially covering a top surface of said second region of optically transmissive material defines an aperture above said light detector.

6. The sensor of claim 1 wherein a deposit pattern of said ink at least partially covering a top surface of said first region of optically transmissive material defines an aperture above said light emitter.

\* \* \* \* \*